United States Patent [19]
Calcinai

[11] Patent Number: 6,163,964
[45] Date of Patent: *Dec. 26, 2000

[54] CORD-TYPE GRASS-CUTTING HEAD WITH MEANS FOR LENGTHENING THE WORN CORD

[75] Inventor: Maria Rosa Calcinai, Florence, Italy

[73] Assignee: Arnetoli Motor di Fabrizio, Florence, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/964,279

[22] Filed: Nov. 4, 1997

[30] Foreign Application Priority Data

Nov. 6, 1996 [IT] Italy .................................. FI96A0261

[51] Int. Cl.[7] ...................................................... B26B 27/00
[52] U.S. Cl. .............................. 30/347; 30/276; 56/12.7
[58] Field of Search ....................... 30/276, 347; 56/12.7

[56] References Cited

U.S. PATENT DOCUMENTS

| | | | |
|---|---|---|---|
| 4,185,380 | 1/1980 | Hindman, Jr. .............................. | 30/347 |
| 4,236,311 | 12/1980 | Mitchell ..................................... | 30/276 |
| 4,335,510 | 6/1982 | Close et al. ................................ | 30/276 |
| 4,599,796 | 7/1986 | Baba ......................................... | 30/276 |
| 4,959,904 | 10/1990 | Proulx ....................................... | 30/347 |
| 4,989,321 | 2/1991 | Hoffmann .................................. | 30/347 |
| 5,020,223 | 6/1991 | Desent et al. .............................. | 30/347 |
| 5,060,384 | 10/1991 | Everts ....................................... | 30/347 |
| 5,109,607 | 5/1992 | Everts ....................................... | 30/347 |
| 5,136,782 | 8/1992 | Calcinai .................................... | 30/347 |
| 5,193,278 | 3/1993 | Osakabe et al. ........................... | 30/347 |
| 5,339,526 | 8/1994 | Everts ....................................... | 30/347 |

FOREIGN PATENT DOCUMENTS

| | | |
|---|---|---|
| 0 315 603 A1 | 5/1989 | European Pat. Off. . |
| 0 512 784 A1 | 11/1992 | European Pat. Off. . |
| 6-335312 | 12/1994 | Japan . |

*Primary Examiner*—Rinaldi I. Rada
*Assistant Examiner*—Kim Ngoc Tran
*Attorney, Agent, or Firm*—McGlew and Tuttle, P.C.

[57] ABSTRACT

The head comprises two covers (3, 5) connected together and an intermediate ring (7), these defining a volume for containing at least one cutting cord (F). The intermediate ring (7) comprises spring means (7A, 7B, 7C) that lock said intermediate ring (7) angularly to at least one of said covers in such a way as to prevent relative rotation between the intermediate ring and the cover in the direction in which the ring tends to be rotated by the resistive force ($F_r$) acting on the portions of cutting cord projecting from the head (1) during the rotation of the latter; at the same time the spring means permit relative rotation in the opposite direction by torsionally releasing the intermediate ring from said cover, by the action of the traction exerted on said projecting ends of the cutting cords (F).

19 Claims, 6 Drawing Sheets

CORD-TYPE GRASS-CUTTING HEAD WITH MEANS FOR LENGTHENING THE WORN CORD

DESCRIPTION

1. Technical Field

The present invention relates to a grass-cutting head of the type that comprises a case in two portions joined together and an intermediate ring between said portions, these defining a volume for storing a cutting cord which passes out through corresponding apertures in the intermediate ring of the case.

2. Background Art

A head of this type is disclosed in, for example, U.S. Pat. No. 5,193,278. This known head incorporates a complicated automatic system for lengthening the cord, which generates a given angular rotation of the intermediate ring when the cord passing out of the head becomes worn and is too short to work properly. Its operation is based on the fact that as the length of the cord projecting from the head varies, so does the number of revolutions of this head during its operation and hence so does the centrifugal force acting on the components contained inside it. The changing centrifugal force activates the cord lengthening means. The device is very complicated and expensive and is therefore ill adapted to amateur use, in particular. Furthermore it does not allow manual lengthening of the cords. When the two covers are joined together with the intermediate ring between them, the latter ring cannot be turned manually either for winding or unwinding the cord.

It is an object of the present invention to provide a head of the type described above which is simple and practical to use, inexpensive and simple to assemble.

SUMMARY OF THE INVENTION

Basically, according to the invention, the intermediate ring located between the two covers comprises spring or latch means that lock said intermediate ring angularly to at least one of said covers in such a way as to prevent relative rotation between the intermediate ring and the cover in the direction in which the ring tends to be rotated by the resistive force acting on the portions of cutting cord projecting from the head during the rotation of the latter. At the same time, the spring or latch means are constructed in such a way as to permit relative rotation in the opposite direction by torsionally releasing the intermediate ring from the covers, by the action of the traction exerted on said projecting ends of the cutting cords.

In this way the cutting cords can be lengthened manually in a very simple way, that is by grasping the ends of the cords projecting from the head and pulling them radially outwards. The spring or latch means will (if the cord is wound in the right direction inside the head) allow the ring to disengage itself from the covers and rotate and so dispense the cutting cord. At the same time, accidental dispensing of the cord during rotation of the head is reliably prevented.

This can be done with the aid of, for example, spring tongues that are integral with the ring and lock in notches or seats in the covers when the ring is acted on by forces tending to turn it in one direction and that disengage when the forces acting on the ring tend to turn it in the opposite direction. The opposite configuration is also possible, in other words one using tongues integral with either or both covers and locking in seats formed in the ring.

In an especially advantageous embodiment of the head according to the invention, manual releasing means accessible from outside the head are provided for releasing the intermediate ring from the covers and turning it in both directions. This enables the cutting cord to be wound up into the head when it needs replacing, without the head having to be opened.

This arrangement gives a very simple cover, the components of which could actually be fastened together irreversibly, e.g. by bonding or welding the two covers to each other. In such cases, the cord can also be lengthened manually, to compensate for wear, by acting on the releasing means and turning the ring relative to the covers in the opposite direction to the winding direction, rather than by pulling on the free ends.

In one possible embodiment, the spring tongue or tongues are advantageously and preferably made in one piece with the intermediate ring, for instance by a single molding operation, using a plastics material. This makes the head very simple and economical and reduces the number of component parts. However, this does not rule out the possibility of attaching the tongues to the ring as separate items, e.g. by riveting or the like, in which case the tongues may also be made from a different material to the ring, e.g. the ring may be made of plastic and the tongues of metal.

The tongues may comprise protuberances that engage in notches present on at least one of the two covers.

The tongues can be released with the aid of, for example, radial projections accessible around the cylindrical lateral surface of the head, between the two covers.

For greater ease of handling and to produce a more gradual lengthening of the cord, the head may advantageously comprise, on at least one of the two covers, four notches arranged at angular intervals of 90° from each other.

As is known, hedge trimmers fitted with heads of this type which rotate clockwise or anticlockwise are available commercially. The head according to the present invention is constructed in such a way that the spring means prevent relative rotation between the ring and the covers in one direction only and not in the other. In the simplest version the head may be designed for only one type of hedge trimmer with either clockwise or anticlockwise rotation. It is advantageous, however, if the head can be adapted to both right-hand and left-hand rotating hedge trimmers. To this end, in an especially advantageous embodiment of the invention, the spring or latch means are mounted on said intermediate ring in such a way that, by inverting the position of the intermediate ring with respect to the two covers, it is possible to reverse the direction in which the relative rotation between the intermediate ring and the covers is prevented. For example, the tongue or tongues may have opposing, protuberances that engage in corresponding notches formed in both said covers.

The two covers can be connected together in various ways. For example spring tongue means or other means may be used. The cutting cord may also be secured inside the head in various ways. For example, one of said covers may have a central hub in whose wall is formed at least one, and preferably two, through holes for the cutting cord. In this way a single cord can be passed through the two diametrically opposite holes before being wound around the hub. Alternatively, two separate cords can be secured by inserting their ends into the two holes and then tying two knots on the ends. Another possibility is for said hub to be provided with seats in line with said holes for the passage of the cord, the respective ends of the cutting cords being inserted and anchored in said seats.

BRIEF DESCRIPTION OF THE DRAWINGS

The invention will be understood more clearly from a perusal of the description with reference to the appended drawing, which shows a non-restrictive example of an embodiment of the same. In the drawing, in particular.

DETAILED DESCRIPTION OF EMBODIMENTS

Figure 1:
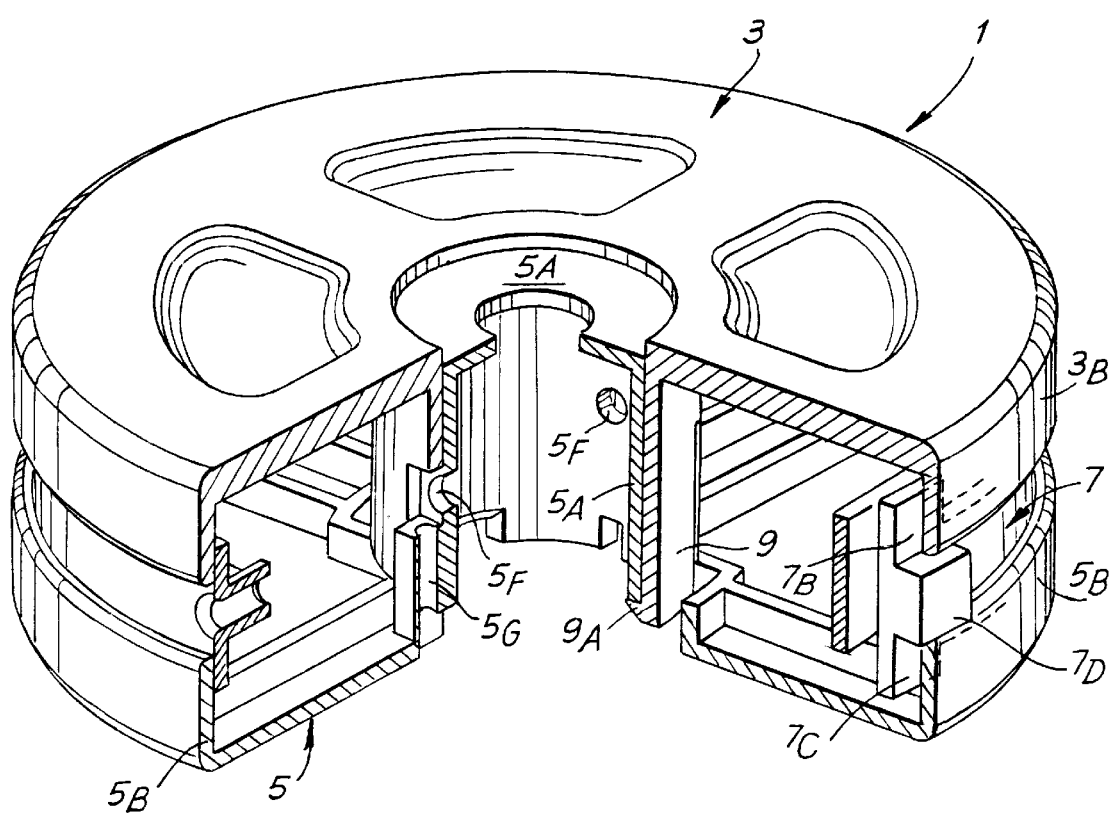
FIG. 1 shows a cutaway isometric view of a head according to the invention.
Figure 2:
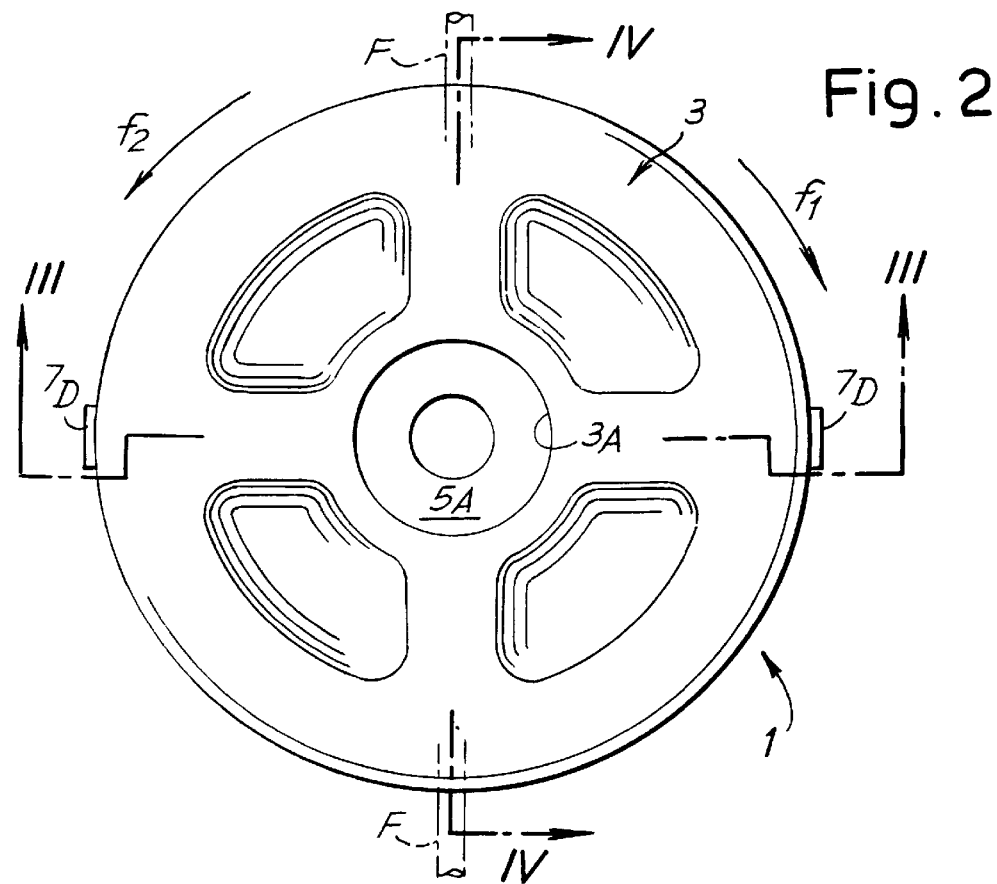
FIG. 2 is a top view of the head of FIG. 1.
Figure 5:
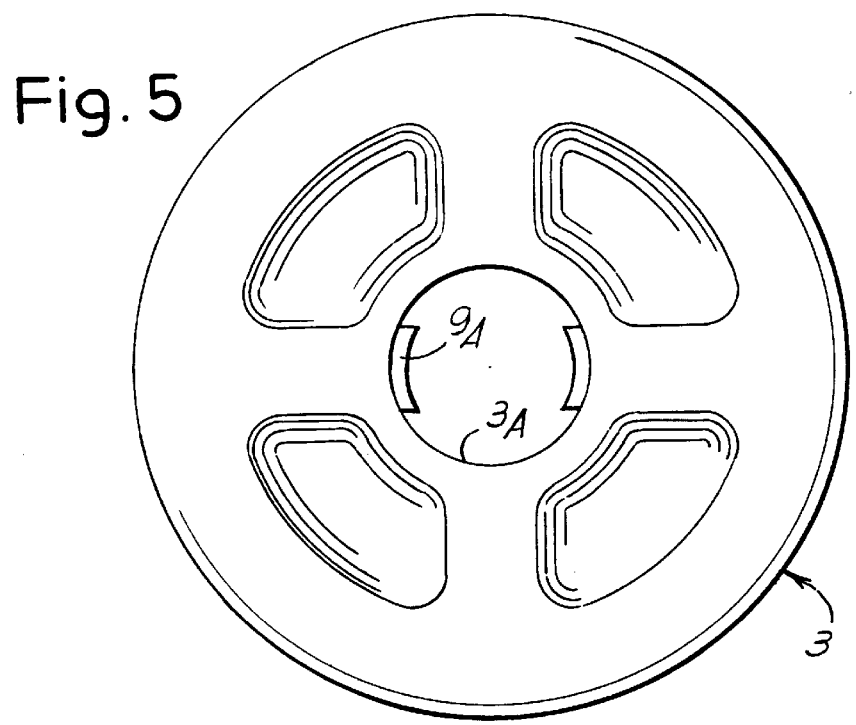
FIGS. 5 to 7 show respective top views of the three components of the head.

With initial reference to FIGS. 1 to 8, the grass-cutting head, which bears the general reference numeral 1, comprises three principal components: a top cover 3, a bottom cover 5 and an intermediate ring 7. When assembled, these define an internal volume inside which is wound a plastic cord whose ends pass out of the head 1 to form cutting members. The cord is omitted in the figures to keep the drawings clear and is indicated purely in dashed lines by way of indication in FIGS. 2 and 4, with only the portions protruding from the case made up of components 3, 5 and 7 being shown.

Figure 8:
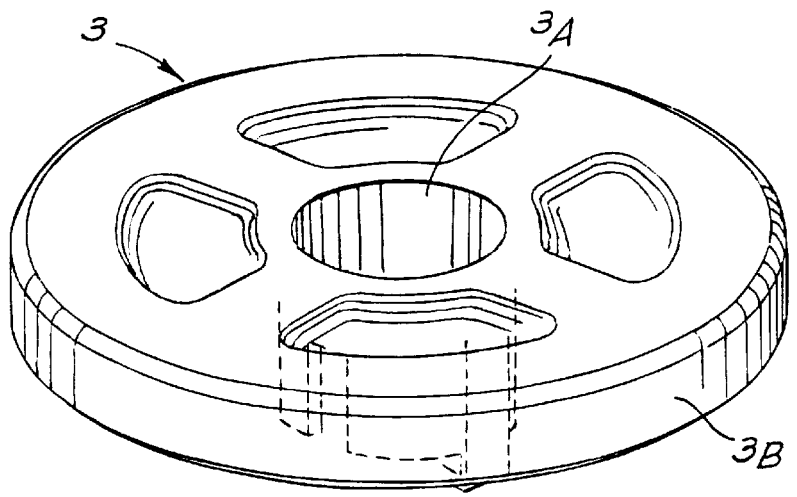
FIG. 8 shows an exploded view of the head.
Figure 8:
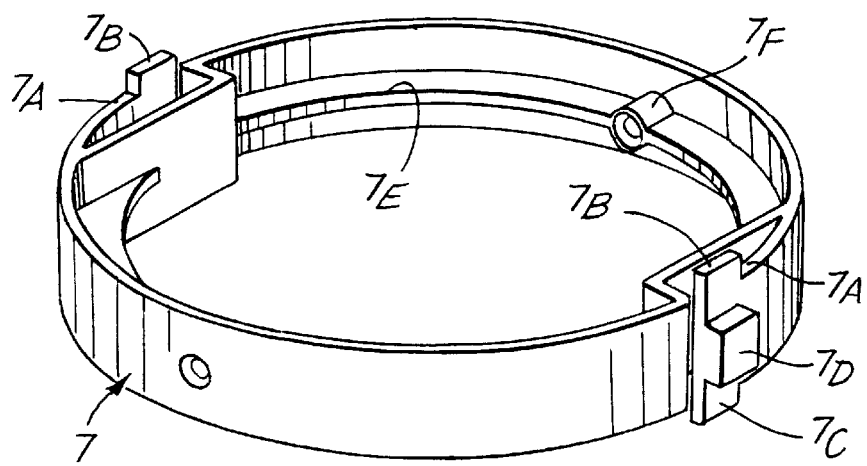
Figure 8:
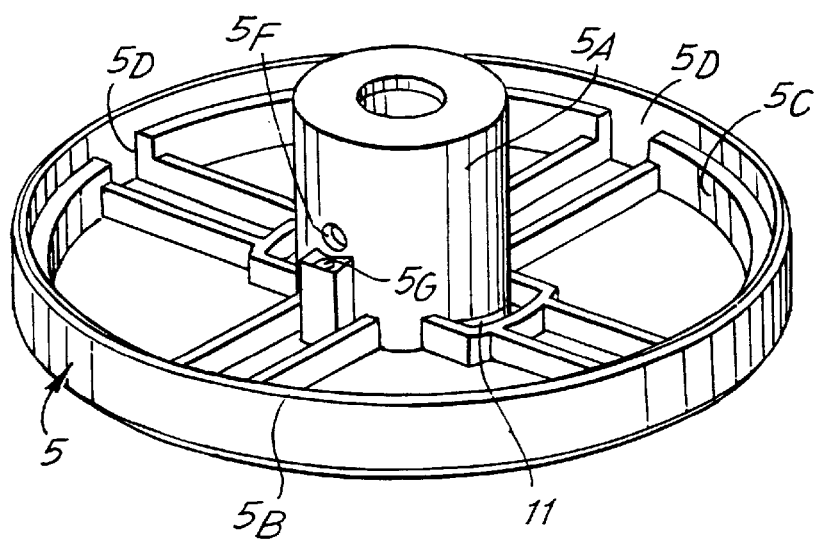

The top cover 3 includes an axial seat 3A, FIG. 8, into which fits a hub 5A belonging to the bottom cover 5. In the example illustrated the top cover 3 and bottom cover 5 are joined together by spring tongues 9 extending down from the cylindrical wall of the axial seat 3A and ending in teeth 9A which snap into apertures 11 formed in the lower edge of the hub 5A.

Figure 3:
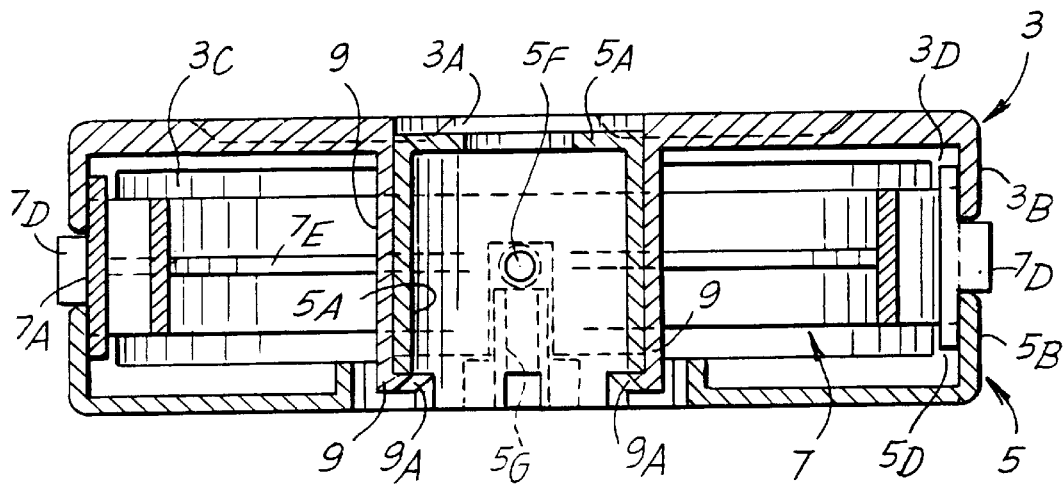
FIGS. 3 and 4 show two sections on III—III and IV—IV as marked in FIG. 2.
Figure 4:
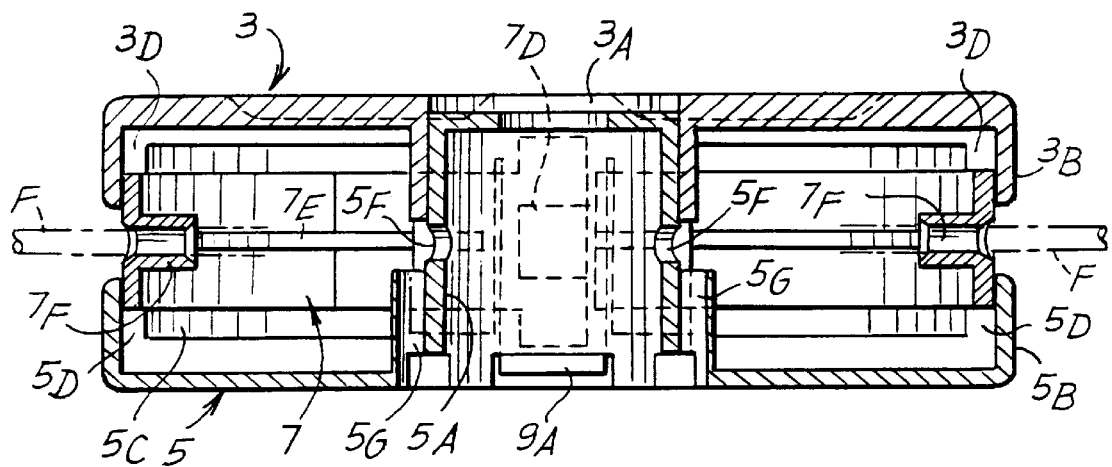
Figure 6:
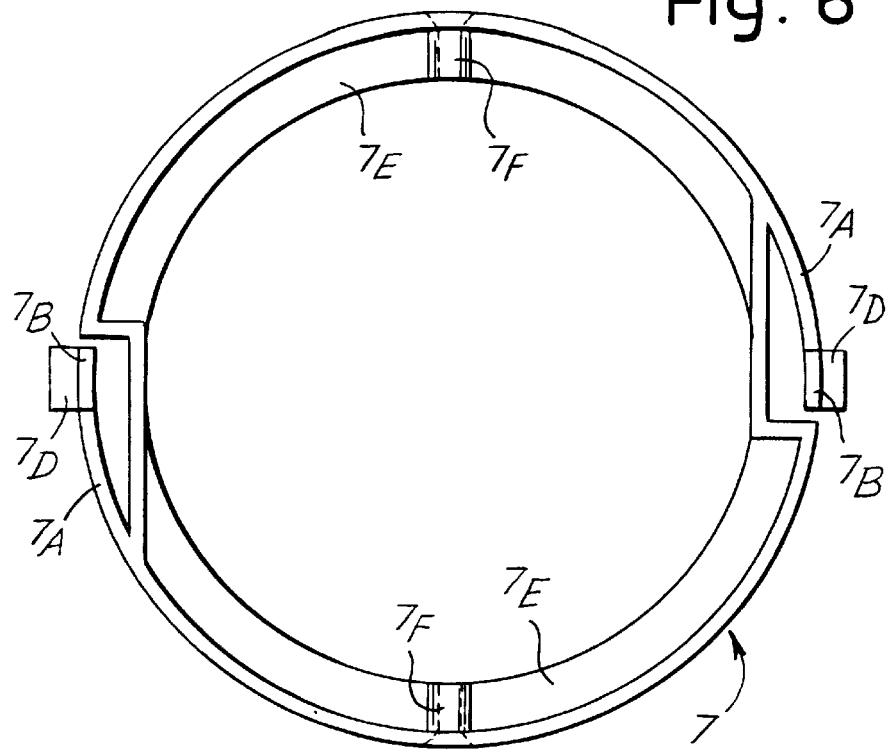
Figure 7:
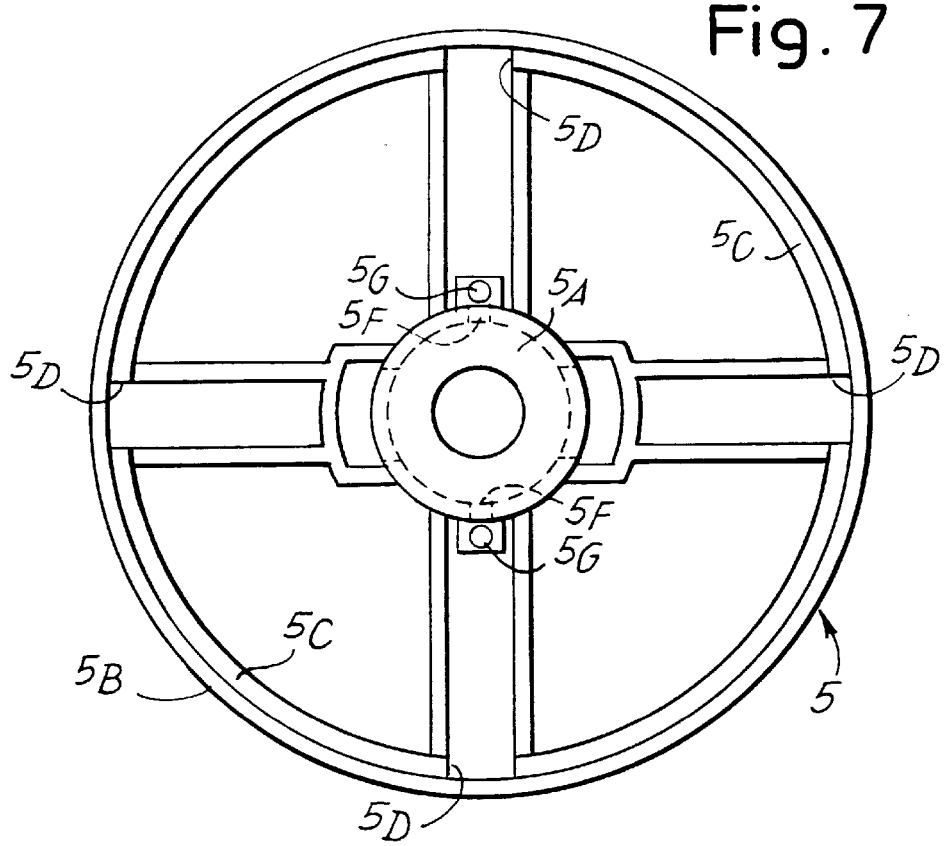

Around the inside of an annular edge 5B of the bottom cover 5 is an annular protuberance 5C in FIG. 8 with four notches 5D spaced out at 90° intervals. A similar arrangement is provided on the inside of the top cover 3, of which the annular edge is shown as 3B, the inner annular protuberance as 3C and the internal notches as 3D (cp. FIGS. 3 and 4).

The intermediate ring 7 has two spring tongues 7A in two diametrically opposite positions, each tongue being provided with two protuberances 7B, 7C, upper and lower respectively. The two spring tongues 7A extend tangentially along a portion of the ring 7. The protuberances 7B, 7C engage in the internal notches 3D, 5D of the two covers 3 and 5. The spring tongues 7A have radial projections 7D which, in the assembled position, project slightly from the external cylindrical surface of the annular edges 3B, 5B. The ring 7 can thus adopt two alternative angular positions inside the cover, each position being defined by the position of the notches 3D, 5D.

The ring 7 also possesses an annular stiffening rib 7E on which two bushes 7F are formed, with outer cord passages in diametrically opposite positions at angles of 90° with respect to the tongues 7A, for the cutting cord F to pass through. It is also possible to have a different number of bushes. In fact the bushes may also be separate items fitted to the ring, e.g. metal bushes.

In the cylindrical wall of the hub 5A are two diametrically opposite holes 5F for the insertion of the inner end of each cutting cord F, which is placed in a corresponding inside end securing seat 5G extending parallel to the axis of the covers 3, 5 and lined up with the respective hole 5F.

In order to insert the cord into the head 1 without having to open it, the procedure is as follows: the bushes 7F are lined up with the holes 5F, i.e. the position shown in FIG. 4. The end of the cord is inserted into one bush 7F through the space between the covers 3, 5, and then pushed through one hole 5F into the internal cavity of the hub 5A. From here the end of the cord is axially pulled out of the internal cavity of the hub, using any tool, or by hand, and then bent back upon itself through 180°. The end of the cord F is then axially inserted from the exterior of the housing into the inside end securing seat 5G. If the ring 7 is in a position in which the bushes 7F are not lined up with the holes 5F, the user simply presses on the radial projections 7D to deform the spring tongues 7A and release the protuberances 7B, 7C from the notches 3D, 5D. The user then rotates the intermediate ring 7 in either direction through 90° with respect to the covers 3, 5 to line up the bushes 7F with the holes 5F.

Once the ends of two cords F have been passed through the bushes 7F and the holes 5F and engaged in the respective seats 5G, the desired amount of cord can be wound up into the head, in the volume formed by the covers 3, 5 and intermediate ring 7, simply by turning the ring 7 clockwise with respect to the covers, which operation is made possible by squeezing the projections 7D to release the protuberances 7B, 7C from the notches 3D, 5D.

Instead of two cords F, it is possible to use a single cord which is passed through both bushes 7F and the holes 5F. In this case there is no need to secure the inner ends of the cords. Alternatively, when using two cords with their ends secured inside the head 1, they can also be made fast by passing the ends through the bushes 7F, then through the holes 5F and then knotting them.

Once the cord F is wound into the head, its ends are left projecting from the bushes 7F to a length suitable for cutting the grass. The direction of rotation of the head, marked $f_2$, is such that the resistive or drag force acting on the portions of cord F projecting from the head tends to turn the ring 7 clockwise with respect to the covers 3, 5 i.e. in the direction of arrow $f_1$ in FIG. 2. The protuberances 7B, 7C of the spring tongues 7A lock in the notches 3D, 5D and prevent the ring 7 and covers 3, 5 from rotating relative to each other under the effect of the resistive force.

When the cord F has worn down, it can be lengthened by manually turning the ring 7 counterclockwise with respect to the covers 3 and 5. This rotation can be easily brought about without pressure on the ring because the tongues 7 and their associated protuberances 7B, 7C do not lock in the notches 3D, 5D in the counterclockwise direction by design of the protuberances 7B, 7C and the bending relation of the tongues 7 to notches 3D, 5D.. Alternatively it can also easily be lengthened by pulling on the projecting ends of the cutting cords F because, if the cord is wound correctly, that is clockwise, around the hub 5A, manual traction on its ends projecting from the cover tends to produce rotation of the ring 7 with respect to the covers 3, 5 in the opposite direction to the tendency of the centrifugal force. In this direction the tongues 7A do not lock in the notches 3D, 5D and the ring turns relative to the covers in the anticlockwise direction, thus dispensing cord F.

If the head 1 is mounted on a spindle that turns in the opposite direction to the arrow $f_2$, the same function is obtained by mounting the ring 7 upside down relative to the position shown in FIG. 8.

Figure 9:
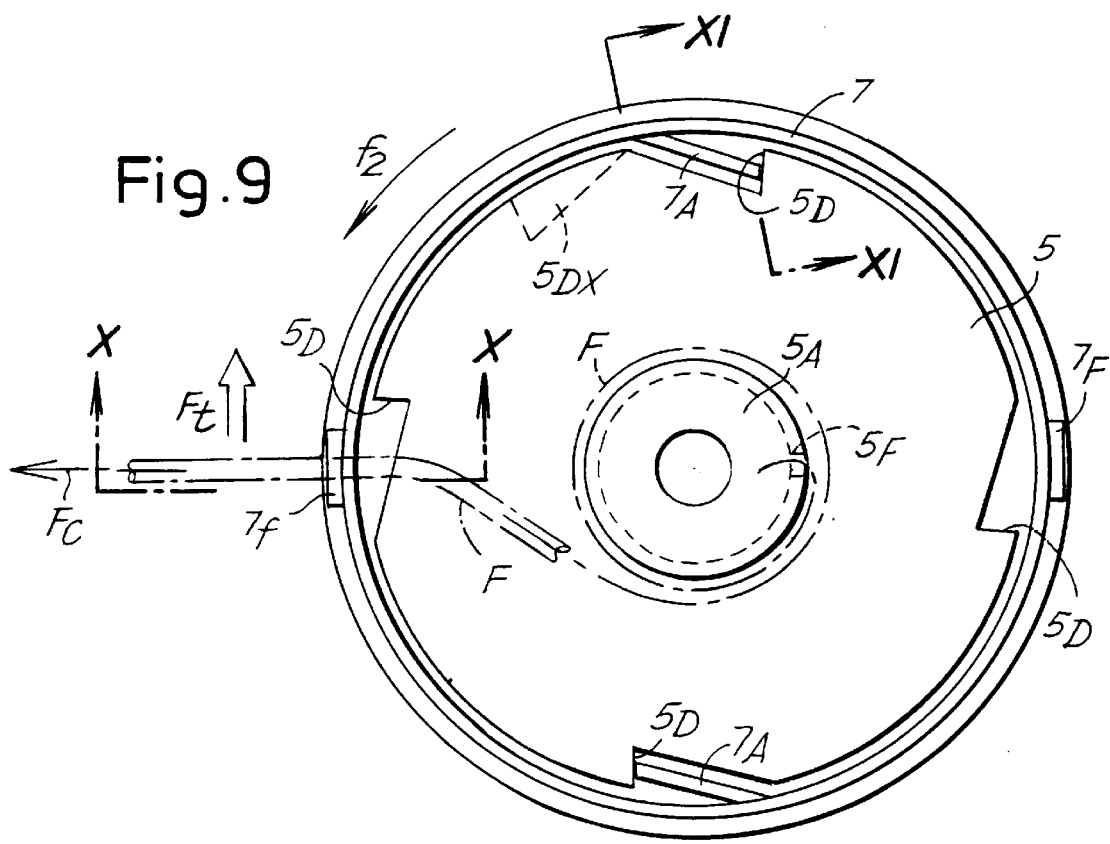
FIG. 9 shows a plan view of a head opened and with the top cover removed, in a second embodiment.
Figure 10:
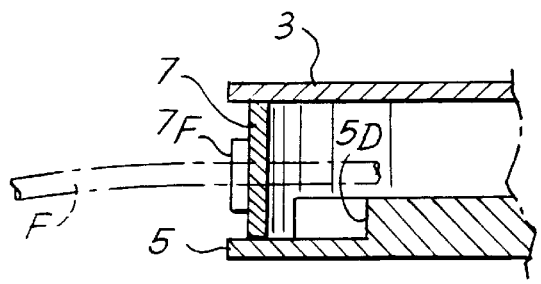
FIGS. 10 and 11 show two local sections on X—X and XI—XI as marked in FIG. 9.
Figure 11:
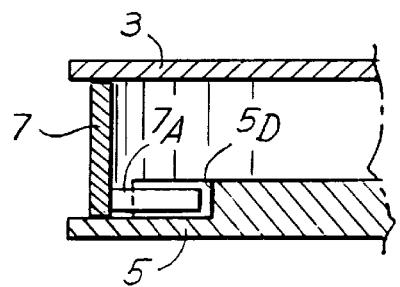

FIGS. 9, 10 and 11 show a different embodiment of the invention. FIG. 9 shows a top view of an open head, that is to say without the top cover 3. The local cross-sections shown in FIGS. 10 and 11 show a sectioned portion of the head with both covers 3, 5 and the intermediate ring 7. Identical numbers indicate identical or corresponding parts to those of the previous figures. In this case the spring tongues 7A of the intermediate ring 7 are formed on the inside of the ring itself and are inclined with respect to both the radial and tangential directions. They engage in notches 5D formed in the base of the bottom cover 5. The notches 5D comprise a bearing wall which is at a shallow angle to the radial direction and against which the tongues 7A abut, and a wall which is at a large angle to the radial direction, approximately parallel to the tongues 7A. In this way, when the head turns anticlockwise as indicated by the arrow $f_2$, a centrifugal force $F_c$ and a resistive force in the tangential direction of arrow $F_t$ act on the end portions of the cutting cords F. The direction of the resistive force $F_t$ is such that the cord F pushes the ring 7 and its tongues 7A in such a way that they lock in the notches 5D and thus prevent relative rotation between the ring and the cover 5. By contrast, when the head is stationary the ends of the cords F can be grasped by hand and pulled in the direction of arrow $F_c$ and, because the cord is wound clockwise (as indicated in chain lines in the figure), the cord exerts a force on the intermediate ring 7 in the opposite direction to the arrow $F_t$, causing the ring to turn anticlockwise relative to the covers: this rotation is made possible by the fact that the spring tongues 7A bend as they are pushed by those walls of the notches 5D that are parallel to them.

This embodiment contains no means of manually releasing the ring in the opposite direction, so the head must be opened in order to refill it with cord. As an alternative, it is possible to make a disposable head, e.g. with the covers welded together, and designed to be thrown away once the cord has been used up. This is made possible by the very light and inexpensive construction of the head according to the present invention.

The version illustrated in FIGS. 9 to 11 may also be made such that the ring can be turned upside down in cases where the head rotates in the clockwise rather than anticlockwise direction. To this end the tongues 7A may, for example, extend (as shown in FIG. 11) for only some of the depth of the ring and the cover 3 may have notches 3D shaped in mirror-image to the notches 5D of the cover 5. In this case, when the ring 7 is turned upside down its tongues 7A will engage with notches which will immobilize the covers and the ring relative to each other in the opposite direction. Alternatively, two symmetrical notches may be formed on either or both of the covers 3, 5 as indicated in broken lines at 5DX on the cover 5 in FIG. 9. With this version identical arrangements of notches on both covers are possible, while the tongues 7A can be equal in depth to the full depth of the intermediate ring 7, for greater strength.

In both embodiments, if the cord F is wound in the wrong direction, which in the example illustrated is anticlockwise as opposed to clockwise as indicated in FIG. 9, the tongues 7 would prevent the cord from accidentally unwinding when the head is in operation. However, it would no longer be possible to lengthen the cord by pulling manually on its ends. In this case, in the embodiment of FIGS. I to 8 lengthening is still possible by pushing on the projections 7D to release the ring from the covers, and then rotating the ring. In the embodiment of FIGS. 9 to 11 the head has to be opened and the cord wound in the correct direction.

It will be understood that the drawing shows only an example purely as a practical demonstration of the invention, it being possible for said invention to be varied as regards shapes and arrangements without thereby departing from the scope of the concept underlying said invention. The presence of any reference numerals in the accompanying claims is intended to facilitate the reading of the claims with reference to the description and drawing, and does not limit the scope of protection represented by the claims.

I claim:

1. Grass-cutting head comprising two covers connected together and an intermediate ring, these defining a volume for containing at least one cutting cord and in which said intermediate ring contains passages through which the ends of the cutting cord can pass out, wherein said intermediate ring comprises ratchet means that lock said intermediate ring angularly to at least one of said covers in such a way as to prevent relative rotation between the intermediate ring and the cover in the direction in which the ring tends to be rotated by the resistive force acting on portions of cutting cord projecting from the head during the rotation of the latter, and wherein said ratchet means permit relative rotation in the opposite direction to the resistive force by torsionally releasing the intermediate ring from said cover, by the action of the traction exerted on said ends of the cutting cord;

manual releasing means accessible from outside the head are provided for releasing the intermediate ring from the covers and turning it in both directions.

2. Head according to claim 1, wherein said ratchet means include at least one spring tongue that engages in a corresponding notch in at least one of said covers.

3. Head according to claim 2, wherein said spring tongues are made in one piece with the intermediate ring.

4. Head according to claim 2, wherein said spring tongue is located on the outer cylindrical surface of said intermediate ring, between the two covers.

5. Head according to claim 2, including two diametrically opposite spring tongues.

6. Head according to claim 2, wherein said at least one tongue has two opposing protuberances that engage in corresponding notches formed in both said covers.

7. Head according to claim 1, wherein said releasing means comprise projections integral with said ratchet means and accessible from outside the head.

8. Head according to claim 1, wherein said ratchet means are mounted on said intermediate ring in such a way that, by inverting the position of the intermediate ring with respect to the two covers, it is possible to reverse the direction in which the relative rotation between the intermediate ring and the covers is prevented.

9. Head according to claim 1, wherein said two covers have spring tongue means for mutual engagement.

10. Head according to claim 1, wherein one of said covers has a central hub in whose wall is formed at least one, and preferably two, through holes for the cutting cord.

11. Head according to claim 10, wherein two inside end securing seats extend parallel to said hub in line with said holes for the passage of the cord, respective inside ends of the cutting cord are inserted and secured in said inside end securing seats.

12. Head according to claim 11, wherein said inside end securing seats are accessible from outside the head.

13. Grass-cutting head with cutting cord, the head comprising;

two covers connected together;

an intermediate ring between said two covers and defining a volume with said two covers for holding a cutting cord, said intermediate ring including an outer cord passage through which ends of the cutting cord can pass out, said intermediate ring is formed in one piece with a resilient tongue cooperating with a notch in at least one of said covers to lock said intermediate ring angularly to said at least one of said covers to prevent relative rotation between said intermediate ring and said one cover in a first rotational direction, said first rotational direction being a direction in which said intermediate ring is biased by drag force acting on portions of said cutting cord projecting from the head during rotation of the head, said resilient tongue permitting relative rotation in a second rotational direction by rotationally releasing the intermediate ring from said one cover by radial traction exerted on said portions of cutting cord projecting from said head, said second rotational direction being substantially opposite said first rotational direction said resilient tongue being accessible from outside of the head for manually disengaging said resilient tongue from said notch.

14. Grass-cutting head with cutting cord, the head comprising;

two covers connected together;

an intermediate ring between said two covers and defining a volume with said two covers for holding a cutting cord, said intermediate ring including an outer cord passage through which ends of the cutting cord can pass out, said intermediate ring is provided with a resilient tongue cooperating with a notch in at least one of said covers to lock said intermediate ring angularly to said at least one of said covers, said resilient tongue permitting relative rotation in an unwinding direction by rotationally releasing the intermediate ring from said one cover by radial traction exerted on said portions of cutting cord projecting from said head, said resilient tongue being accessible from outside of the head for manually disengaging said resilient tongue from said notch.

15. A cutting head in accordance with claim 14, wherein:

said resilient tongue extends substantially tangentially along said intermediate ring.

16. Grass-cutting head comprising two covers connected together and an intermediate ring, these defining a volume for containing at least one cutting cord and in which said intermediate ring contains passages through which the ends of the cutting cord can pass out, wherein said intermediate ring comprises ratchet means that lock said intermediate ring angularly to at least one of said covers in such a way as to prevent relative rotation between the intermediate ring and the cover in the direction in which the ring tends to be rotated by the resistive force acting on portions of cutting cord projecting from the head during the rotation of the latter, and wherein said ratchet means permit relative rotation in the opposite direction by torsionally releasing the intermediate ring from said cover, by the action of the traction exerted on said ends of the cutting cords, said ratchet means include at least one spring tongue that engages in a corresponding notch in at least one of said covers, said tongue includes a first protuberance extending in an axial direction that engages in notches present on at least one of said two covers, said tongue also includes a radial protuberance extending radially outward at an end of said tongue.

17. Grass-cutting bead comprising two covers connected together and an intermediate ring, these defining a volume for containing at least one cutting cord and in which said intermediate ring contains passages through which the ends of the cutting cord can pass out, wherein said intermediate ring comprises ratchet means that lock said intermediate ring angularly to at least one of said covers in such a way as to prevent relative rotation between the intermediate ring and the cover in the direction in which the ring tends to be rotated by the resistive force acting on portions of cutting cord projecting from the head during the rotation of the latter, and wherein said ratchet means permit relative rotation in the opposite direction by torsionally releasing the intermediate ring from said cover, by the action of the traction exerted on said ends of the cutting cords, said ratchet means include at least one spring tongue that engages in a corresponding notch in at least one of said covers, said spring tongue is formed on a radially inner surface of the intermediate ring aid tongue includes a first protuberance extending in an axial direction that engages in notches present on at least one of said two covers, said tongue also includes a radial protuberance extending radially outward at an end of said tongue.

18. Head according to claim 17, including, on at least one of the two covers, four notches arranged at angular intervals of 90° from each other.

19. A rotational cutting head comprising;

a first cover, a second cover connected to said first cover;

an intermediate ring positioned rotatable between said first and second covers, said covers and said intermediate ring defining a volume for holding a cutting cord, said intermediate ring defining an outer cord passage;

a ratchet connected to said intermediate ring for blocking rotation of said intermediate ring with respect to one of said covers in a first rotational direction, said ratchet rotatably connecting said intermediate ring with respect to said one cover in a second rotational direction, said second rotational direction being substantially opposite said first rotational direction;

cutting cord wound in a winding direction in said volume and having an end extending out of said outer cord passage, said winding direction causing unwinding of said cutting cord and rotation of said intermediate ring in said second rotational direction when said end of said cutting cord is pulled radially outward with respect to said one cover;

rotation of the cutting head creates a drag force on said end of said cutting cord and on said intermediate ring in said first rotational direction, said rotation of the cutting head creates a centrifugal force on said ends of said cutting cord and creates an unwinding force on said intermediate ring in said second rotational direction, said drag force in said first rotational direction being larger than said unwinding force in said second rotational direction;

manual releasing means outside the cutting head and rotationally releasing said intermediate ring from said one cover in said first rotational direction when actuated by a user.

* * * * *